United States Patent
Hofmann

(10) Patent No.: US 7,263,413 B1
(45) Date of Patent: Aug. 28, 2007

(54) ELECTRONIC CONTROL SYSTEM FOR INSTALLATIONS WHICH GENERATE COMPRESSED AIR OR VACUUMS

(75) Inventor: Reinhold Hofmann, Ahorn-Eicha (DE)

(73) Assignee: Kaeser Kompressoren GmbH, Coburg (DE)

( * ) Notice: Subject to any disclaimer, the term of this patent is extended or adjusted under 35 U.S.C. 154(b) by 0 days.

(21) Appl. No.: 09/719,507

(22) PCT Filed: Jun. 11, 1999

(86) PCT No.: PCT/EP99/04045

§ 371 (c)(1),
(2), (4) Date: Dec. 12, 2000

(87) PCT Pub. No.: WO99/66374

PCT Pub. Date: Dec. 23, 1999

(51) Int. Cl.
*G05B 15/00* (2006.01)

(52) U.S. Cl. ............................. 700/275; 700/9; 700/19; 700/20; 700/83

(58) Field of Classification Search ................ 700/275, 700/17, 18, 9, 19, 20, 50, 83, 89, 266; 202/166, 202/177, 180
See application file for complete search history.

(56) References Cited

U.S. PATENT DOCUMENTS

| | | | | | |
|---|---|---|---|---|---|
| 5,759,148 A | * | 6/1998 | Sipin | ............................ | 600/18 |
| 5,980,695 A | * | 11/1999 | Cox et al. | .................... | 202/166 |
| 5,992,776 A | * | 11/1999 | Arcaini et al. | ................ | 241/77 |
| 6,289,737 B1 | * | 9/2001 | Kouketsu et al. | ............. | 73/714 |

* cited by examiner

Primary Examiner—Leo Picard
Assistant Examiner—Charles Kasenge
(74) Attorney, Agent, or Firm—Collard & Roe, P.C.

(57) ABSTRACT

The invention relates to an electronic control system for aggregates which generate compressed air or vacuums. The inventive system comprises programmable electronic circuits for controlling, regulating and monitoring the technical functions of aggregates of this type, especially the functions of the compressed air generator or the vacuum pump and the corresponding drive mechanisms, and air treatment. The aim of the invention is to provide a control system which will simplify construction (design), production, assembly, commissioning, maintenance, checks for defects and repairs despite the variety of different types of aggregates and the different conditions of use. To this end, the inventive electronic control system is configured as a standardized control system for use in a number of different aggregates for generating air pressure and/or vacuums and has an industrial PC or microcomputer which is monitored and controlled by an operating system and which has one or more microprocessors and a central data memory. The data memory contains at least control and regulation software as well as a number of aggregate-specific data profiles which are each provided for a particular type of aggregate and can be called up separately.

28 Claims, 5 Drawing Sheets

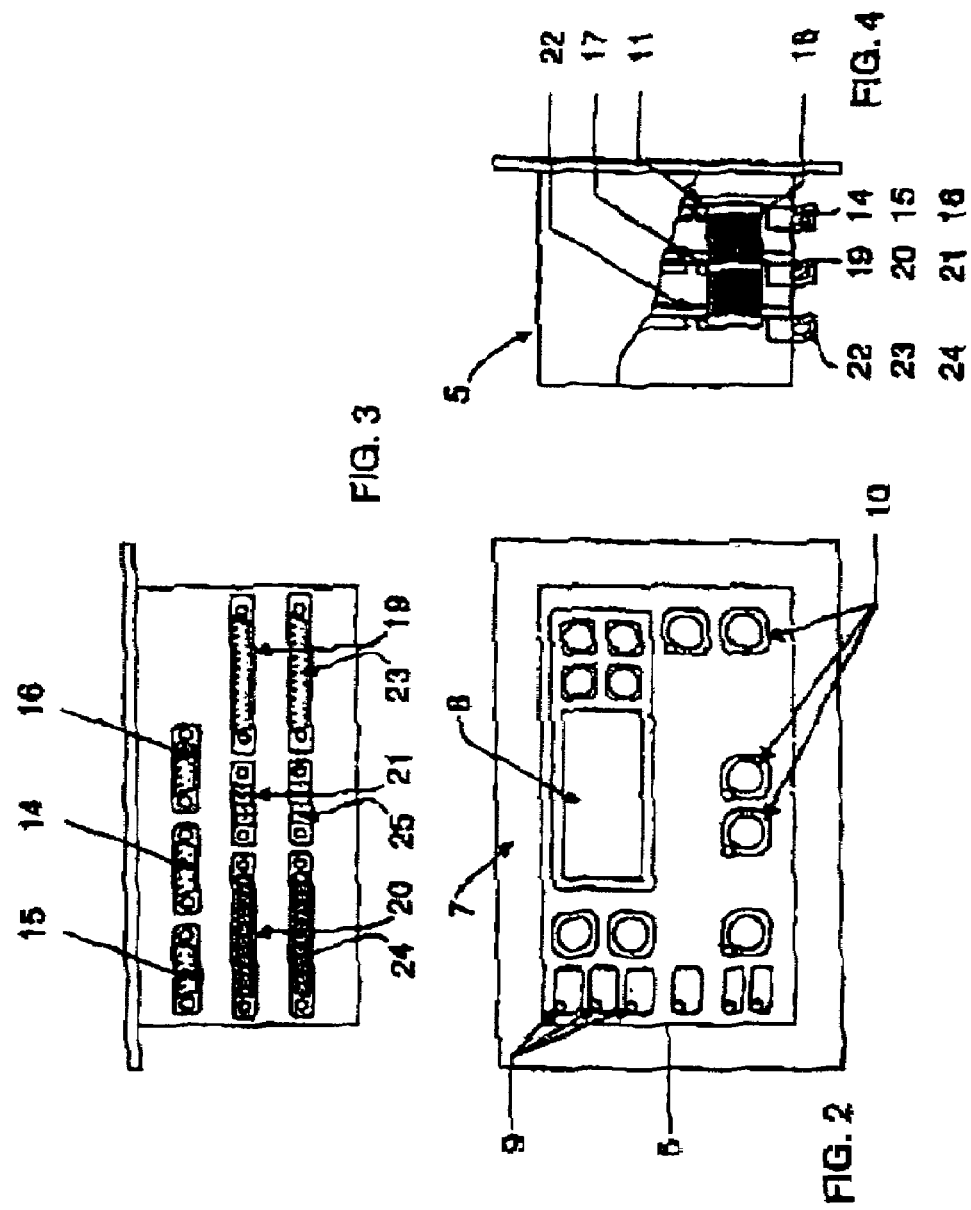

ELECTRONIC CONTROL SYSTEM FOR INSTALLATIONS WHICH GENERATE COMPRESSED AIR OR VACUUMS

Applicant claims priority under 35 U.S.C. §119 of German Application No. 198 26 169.1 filed Jun. 13, 1998. Applicant also claims priority under 35 U.S.C. §365 of PCT/EP99/04045 filed Jun. 11, 1999. The international application under PCT article 21(2) was not published in English.

The invention relates to an electronic control system for aggregates that generate compressed air or vacuums, with programmable electronic circuits for controlling, regulating and monitoring the technical functions of aggregates of such type, in particular the functions of the compressed air generator or the vacuum pump and the drives associated therewith, as well as the treatment of the compressed air.

The electronic control systems for installations for generating compressed air or vacuums that have become known heretofore in the prior art, operate with electronic control systems associated with the individual functions or groups of functions of such equipment. To the extent to which the equipment has to be connected to primary control systems, stored-program type electronic control systems (SPS) or manufacturer-owned special control systems provided with interfaces suitable for their connection to primary systems are employed as electronic control systems as well. Since there are very substantial differences under technical aspects between the functions of the various compressed air generators, vacuum pumps, driving aggregates, or the equipment for treating compressed air, it is difficult to link the individual electronic controls with each other in any meaningful way. It is especially difficult to couple such electronic control systems with mostly standardized primary controlling and coordinating systems, or to link such systems with each other.

Furthermore, the special construction (design), the manufacture, the assembly and the start-up of such control systems is quite generally connected with relatively high labor expenditure because it is necessary time and again to take into account criteria deviating from one another. In view of the great variety of variations problems arise with respect to the logistics and the stockkeeping of spare parts. Furthermore, the great variety of different control systems makes it extremely complicated and costly to service and repair such electronic control systems and requires the service personnel to be highly experienced and attentive because all circumstances have to be taken into account again anew from one installation to the next. The consequence thereof are high maintenance and service costs and complicated error analyses in case of failure of an installation.

The problem of the invention, therefore, is to provide a novel electronic control system for aggregates for generating compressed air and vacuums that permits in spite of the great variety of types of various aggregates and the different conditions of use, a simple construction (design), manufacture, assembly, start-up, maintenance, error search and repair.

For solving said problem the invention proposes based on an electronic control system of the type specified above that the electronic control system is configured in the form of a standardized control system for application in a multitude of different aggregates employed in the generation of compressed air or vacuums, and that said electronic control system has an industrial PC or an industrial micro-computer that is monitored and controlled by an operating system, with one or a plurality of microprocessors and a central data memory, said data memory containing at least controlling and regulating software and a multitude of aggregate-specific data profiles in a recallable manner, said data profiles comprising the data belonging to the aggregates and their components with respect to the controlling and regulating algorithms and/or the controlling and/or the regulating parameters and/or the technical characteristics and limit values and/or the aggregate-specific occupancy of the inputs and outputs.

The invention realizes for the first time a standardized universal control system for aggregates used in the generation of compressed air and vacuums that can be employed for a great number of different types of aggregate and adapted without any problems to each of such different types of aggregate as well. After the control system has been installed in any desired type of aggregate, only the data profile specific to such type of aggregate needs to be activated for the start-up via the control surface and without having to depend on a programming device or similar equipment. Since the control hardware is the same for all types of aggregate and the differentiation in view of different types of aggregate has been shifted to the software, the result is an extremely simple control system that can be manufactured, installed, adapted, controlled, handled and serviced in a conceivably simple manner.

The operating system of the industrial PC or industrial microcomputer usefully is a real-time operating system. This offers the advantage that when the electronic control system as defined by the invention is in operation, all controlling and regulating interventions are carried out immediately without annoying time delay.

Furthermore, provision is usefully made that a running-time system (software processor or virtual machine) is installed on the operating system that converts program instructions of the controlling and regulating software into a representation that can be processed by the one or several microprocessors of the control system, and which assumes the control over said one or several microprocessors. Such a running-time system, which can be referred to also as a software processor or a virtual machine, permits communication between the controlling and regulating software, on the one hand, and the one or several microprocessors of the industrial PC or industrial microcomputer on the other, so that it is readily possible to employ for the control system as defined by the invention tested and available controlling and regulating software, or modules of such controlling and regulating software.

The running-time system usefully is a soft-PLC or a soft-SPS and emulates a memory-programmable control. It is possible in this way with the control system as defined by the invention to make use of the wide spectrum of rich experience gained in conjunction with any type of stored-program control systems.

According to another useful further development of the control system as defined by the invention, provision is made that the operating system of the industrial PC or industrial microcomputer supports without the use of any additional running-time system the employment of a programming language for the controlling and regulating software.

In any case, i.e. both with and without the use of a running-time system, the controlling and regulating software is programmed in a programming language, for example in a programming language for stored-program control systems.

In a particularly preferred embodiment of the control system as defined by the invention, the software in the central main data memory at least consists of
- components for the controlling and regulating logic;
- components for controlling a control surface (operating and observing software);
- components for managing a history memory (order processing); and
- components for communicating via interfaces (communication applications);

whereby said components access a common database in which the data profiles are stored as well.

In this way, the control system as defined by the invention can make do with one single large data memory whose contents can be called up in the combination required in the given case.

Furthermore, the control system as defined by the invention is characterized by a multitude of digital and/or analog inputs and outputs for detecting the condition and for controlling the connected aggregate components, whereby the occupancy of such components can be fixed via the controlling and regulating software; by a controlling surface with plain-text display; and by one or a plurality of standardized interfaces for communicatively connecting primary, secondary or subordinated systems. The industrial PC or the industrial microcomputer and the associated data memory are arranged in this connection in a compact, screened housing, which can be installed in the control panel of an aggregate for generating compressed air or vacuums, and whose front side has the control panel surface with plain-text display, whereas the back wall and/or the top wall and/or the bottom wall and/or the side walls of the housing are provided with digital and/or analog inputs and outputs as well as with the interfaces. The controller so formed has a compact structure and can be installed in the control panels of any type of aggregate employed for generating compressed air or vacuums.

Since the controller with the integrated control surface together with the control hardware, is the same for all aggregates, and the differentiation is carried out only within the sphere of the software, the result is a universal controller that can be employed in a great variety of ways without any external change.

Furthermore, owing to the standardized interfaces provided on the compact controller, it is possible in a simple manner to link the present control system with other data processing systems, for example to connect it to primary coordinating control systems, and to couple it with parallel systems, or to connect it with remotely controlled data transmission systems (RDTS) for the purpose of remote data transmission or remote control. It is possible, for example, to establish via the data interfaces and by way of a suitable modem a connection for remote monitoring of the of the aggregate by the manufacturer or by a service provider, for example via the fixed telephone network, the GMS radio network, or via the Internet.

Provision is usefully made that the aggregate-specific data profiles comprise the data associated with each type of aggregate and its components with respect to the controlling and regulating algorithms and/or the controlling and regulating parameters and/or the technical characteristics and limit values and/or the aggregate-specific occupancy of the inputs and outputs; and that said data can be called up from the data memory combined for each type of aggregate. After the control system has been installed, it is possible in this way to first activate in a simple manner the standardized control system of such a specific type of aggregate without requiring for that purpose special factual expertise or comprehensive installation and programming work operations.

For the fine adaptation of each data profile called up, provision is made that the data of each data profile called up, including the data determining the occupancy of the inputs and outputs, are variable by means of the control surface and/or via one of the data interfaces. It is possible in this way to adapt each stored data profile at a later time, if necessary, to the conditions existing in the concrete individual case, or to the special wishes of the user.

Several different, password-protected and hierarchically graded levels are usefully set up for changing the data profiles or other settings. The lowest level is usefully provided for the user of the installation and only permits changing just a few parameters within preset limits that do not pose any danger to the operation of the overall installation. The next higher levels are exclusively accessible to the maintenance and service personnel and already permit deeper interventions in the data profile depending on the qualification of such service personnel. The highest level is exclusively reserved for the manufacturer and permits serious changes of a data profile, or, if need be, also the set-up of an entirely new data profile, if this should be found to be necessary.

Provision is made according to a particularly advantageous further development of the invention that the history memory keeps records for purposes of error analysis and analysis of the operating performance over a large span of time of certain events or conditions that occurred in the past, in the form of dates, clock time, status and explanations. The term status is understood in this connection to be an information in regard to whether a condition occurred, has ceased to exist, or has been acknowledged. It is intended in this connection to retain a record, for example of the last 100 events and conditions as well as of the circumstances that triggered and ended such events and conditions, so that when the history memory is called up it is possible to determine when and under which circumstances problems have occurred in the past.

The content of the history memory can be called up in plain text for said purpose on the display or via the communicative interfaces. The content of the history memory can be displayed in this way on a display screen or printed out by means of a printer.

Furthermore, provision is made according to another particularly advantageous further development of the invention for an evaluation algorithm for the history memory. With the help of such an evaluation algorithm, the performance of the control system can be optimized for the future by means of the stored results and/or conditions from the past. Such an intelligently configured control system thus can in a way learn from the operating performance of the past and optimize the future operating performance.

Special advantages are obtained if the software of the industrial PC or the industrial microcomputer is freely programmable locally or by remote data transmission via one of the data interfaces, and therefore adaptable in any desired way. It is possible in this manner to optimally adapt the control systems to the technical development, and to include in the control system, if need be, entirely new control criteria and/or data profiles of new aggregates as well. Thus the system created by the control system as defined by the invention is releasable as well.

According to a further development of the control system as defined by the invention, the software of the industrial PC or industrial microcomputer can be provided also with a programmable timer function that is capable of controlling the aggregate according to a preset time program. This makes it possible to take into account in the control system, for example shutdown periods such as long waiting periods, vacation time and the like.

For cases in which it is necessary to take into account a particularly large number of input values that can be determined only in an unclear way, the control system as defined by the invention makes provision that aggregate-specific software fuzzy controllers can be installed on the industrial PC or industrial microcomputer. Such fuzzy controllers each consist of an aggregate-specific control base, an inference machine and a condition interface associated with the inputs, as well as an action interface associated with the outputs. Such a fuzzy controller, which is only configured in software as well, makes it possible in a simple way to control the connected aggregate for generating compressed air or vacuums according to the rules of the fuzzy logic, which is known to make it possible to take into account a particularly large number of input conditions, whereby such input conditions may be linked with each other in a complex manner and do not even have to be measured in any exact way.

Provision is made for at least one serial RS-232 interface as the standardized communicative interface, to which a programming device, a printer or a modem can be selectively connected, and by which the electronic control system can be controlled by way of telephone lines, the Internet, GSM radio telephone, or by means of some other suitable remote data transmission system.

To serve as the second communicative interface, the control system as defined by the invention makes provision for at least one serial interface according to the RS-485 standard. Such an interface is particularly suited for point-to-point connections of the control systems of two aggregates operating in parallel.

Finally, provision is made for at least one profi-bus interface to serve as the third standardized communicative interface. Such an interface is particularly suited for coupling the control system to primary coordinating control systems. If need be, a connection to a remote data transmission system can be established via said interface and a suitable modem as well.

For cases in which inputs and outputs is required are required in particularly large numbers, provision is made, furthermore, that the system bus of the industrial PC or industrial microcomputer is preferably provided with additional inputs and outputs for connecting extension pc motherboards.

All inputs and outputs are usefully realized in the form of plug terminals located on the back wall and/or the top wall and/or the bottom wall and/or the side walls of the housing. It is possible in a simple way in this manner to install the entire wiring within the space located behind the control panel of the aggregate.

The control surface of the control system usefully has a protected foil-type keyboard and an LCD display, whereby all functions of the control system can be called up via the foil keyboard in a menu-guided manner, and said functions are readable with their data displayed on the LCD display in different languages or unit systems in a manner that permits online reversing. By virtue of the foil-type keyboard, in conjunction with the menu-guided call-up of the different functions, the control system is controlled in an extremely simple manner, and it is susceptible to trouble only in minor ways.

Furthermore, the control surface usefully has light-emitting diodes for monitoring and displaying the principal functions as well as for trouble reports. It is assured in this way that the most important operating conditions, trouble alert reports or maintenance messages can be seen already from far away without having to read the data displayed on the display.

Furthermore, provision is made on the control system as defined by the invention for additional free inputs and outputs in addition to the inputs and outputs occupied by the type of aggregate connected to the system. It is possible with the help of such available inputs and outputs to interrogate, if need be, further information and/or to input such additional information that is additionally requested for the given user of the aggregate for whichever reasons. The occupancy of the extra inputs and outputs is programmable by means of the control system as defined by the invention in a simple manner as well.

Finally, provision is made that a test mode can be called up via the menu control, in conjunction with which the values of the analog and/or digital inputs and outputs can be queried individually locally or via remote data transmission when the aggregate is in operation, and, furthermore, the conditions of the outputs can be preset in any desired way independently of the control logic when the aggregate is shut down. Said additional function makes it possible to individually query, if need be, all analog inputs and outputs while the aggregate is in operation, and to feed the outputs in any desired way with signals in addition to the error diagnosis when the aggregate is shut down.

An exemplified embodiment of the invention is explained in greater detail in the following with the help of the drawings, in which:

FIG. 1 schematically shows the arrangement of the electronic control system as defined by the invention in an installation generating compressed air, and the way the controls are tied to a primary coordinating control system.

FIGS. 2, 3 and 4 show by different and partly sectional views the housing of the control system as defined by the invention.

Figure 1:
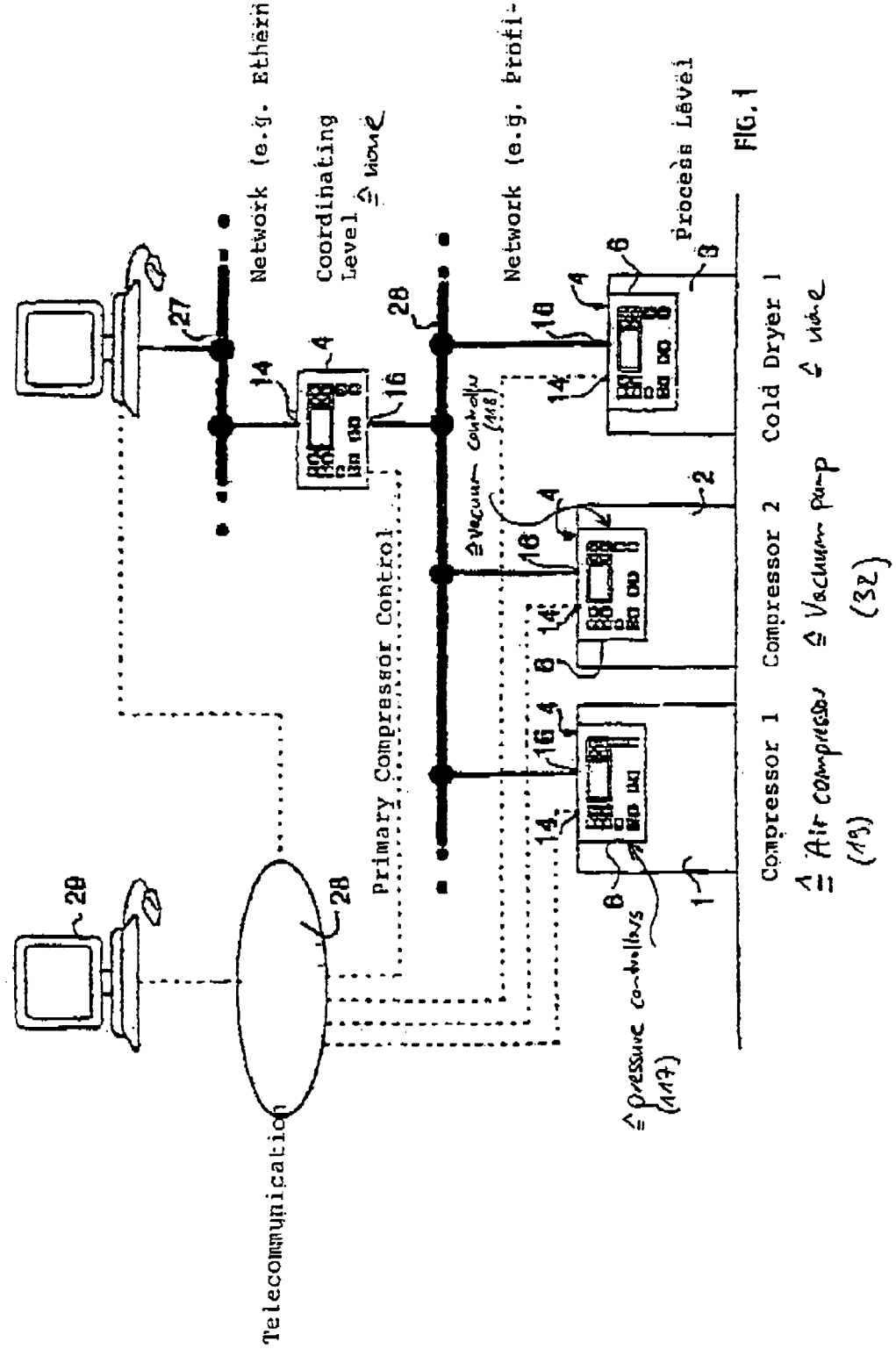

The installation for generating compressed air shown in FIG. 1 has the two compressors 1 and 2 with an integrated electric drive as well as a cold dryer 3 drying the compressed air generated by the compressors 1 and 2. The electronic control systems as defined by the invention are installed in each of the compressors 1 and 2 and in the cold dryer 3.

The electronic control systems 4 each are located in a compact, screened housing 5, which is installed in the control panels 6 of the compressors 1 and 2 and the cold dryer 3.

FIGS. 2 to 4 show that the housing 5 has, located on the front side, a control panel surface 7 with a plain-text display in the form of an LCD display 8. In addition, the control panel surface 7 is provided with a number of light-emitting diodes 9 for operating and fault reports, said LCD's being partly integrated in the control switch 10. The control switches 10 are components of a foil-type keyboard closing the front side of the housing 5 in a sealing manner.

Figure 5:
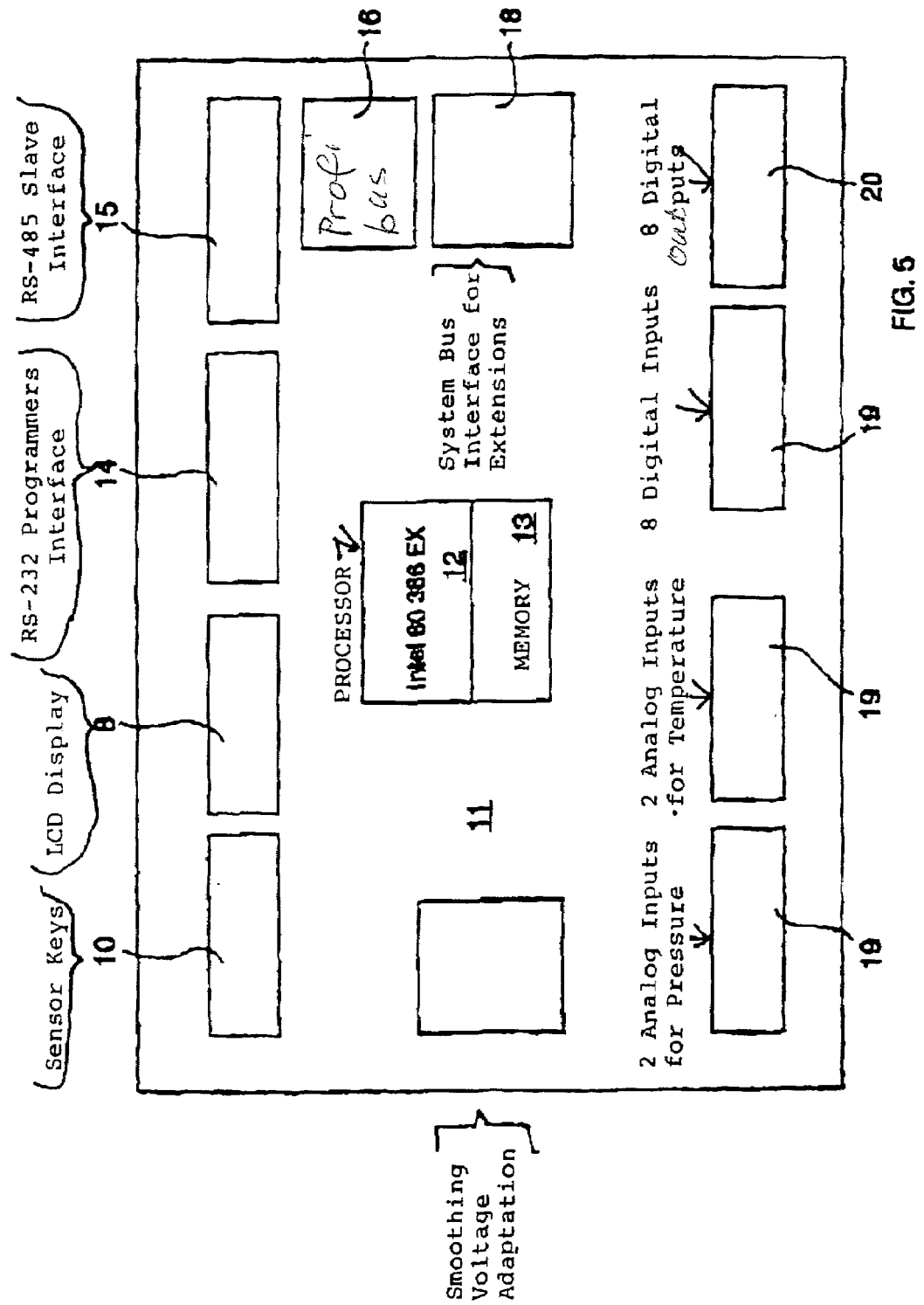
FIG. 5 shows a block diagram of the hardware employed for the control system as defined by the invention.

The electronic control system 4 contained in the interior of the housing 5 has a processor pc motherboard 11 that is fitted with an industrial microcomputer (IMC) or industrial PC 12. Said microcomputer is a type of microcomputer provided with all the important functions of a freely programmable PC employed for industrial applications. Said industrial microcomputer or industrial PC 12 operates with a comprehensive central data memory 13 located on the processor pc motherboard 11 as well (see also FIG. 5). Finally, the processor pc motherboard 11 is provided with three standard data interfaces, specifically the data interface 14 according to the standard RS-232, the data interface 15 according to the standard RS-486, and the data interface 16 according to the profi-standard. The data interfaces 14, 15 and 16 are realized in the form of plug connections and extended at the bottom wall of the housing 5 from the latter.

Furthermore, at least one input/output pc motherboard 17 is located in the housing 5. Said motherboard is connected to the processor motherboard 11 via a system bus 18. The motherboard 17 is provided with plug connections for the inputs 19 of the control system, and furthermore with plug connections for the outputs 20 of the control system, and finally with plug connections for connecting the energy supply 21. Said plug connections of the I/O motherboard 17 are extended within the zone of the bottom wall of the housing 5 from the latter as well.

Furthermore, an extension motherboard 22 is located in the housing 5, which can be connected to the system bus 18 as well, and which is provided with additional plug connections for the inputs 23, for the outputs 24 and for the energy supply 25. The plug connections of the extension motherboard 22 are extended within the zone of the bottom wall of the housing 5 from the latter as well. However, the extension motherboard 22 is used only if more inputs and outputs than provided on the standard I/O motherboard 17 are needed for operating the connected aggregate or the connected installation. The various analog or digital signal emitters of the aggregate to be monitored for the inputs 19 and 23 are connected to the control system. Reversely, the setting devices provided on the aggregate receive their control signals via the outputs 20 and 24 of the control system 4.

Via the interface 14 with the standard RS-232, the control system can be connected to a programming device. It is possible with the help of such a programmer to change and to supplement the content of the central memory 13, i.e. to change and to supplement the data and programs stored in said central memory. Furthermore, a printer can be connected to said data interface 14, and the content of the data memory 13 can be printed out by such a printer in whole or in part. Finally, a connection to a remote data transmission system can be established by means of said interface via a suitable modem, for example a connection to the fixed telephone network, to the GSM radio network, or to the Internet. It is possible with said remote data transmission to monitor the control system, for example from a telecommunication service provided by a service provider, or to carry out interventions, if need be, into the stored data or programs.

It is, furthermore, shown by FIG. 1 that the individual control systems 4 can be connected via the interfaces 16 with the profi-bus standard to the network of a coordinating system 26, which combines the parallel operating aggregates 1, 2 and 3 and coordinates their operations with one another. Said coordinating system 26 operates with a control system 4 as defined by the invention as well, for which purpose a data profile is called up that corresponds with said coordinating function.

In conjunction with the exemplified embodiment according to FIG. 1, the coordinating system 27 of the user, which is connected via the interface 14 with the standard RS-232 to the control system 4 contained in the subordinated coordinating system 26, for example via an Ethernet, is overriding said coordinating system 26. Said overriding supervisory system of the user 27 establishes the connection to the general process control system of the user.

All of the control systems 4 can be connected to the telecommunication service 29 of a service provider via the interfaces 14 with the standard RS-232 and a modem 28 and suitable remote data transmission systems such as, for example the fixed telephone network, the GSM radio network, or the Internet. Remote servicing of the connected aggregates and installations is made possible in this way.

Figure 6:
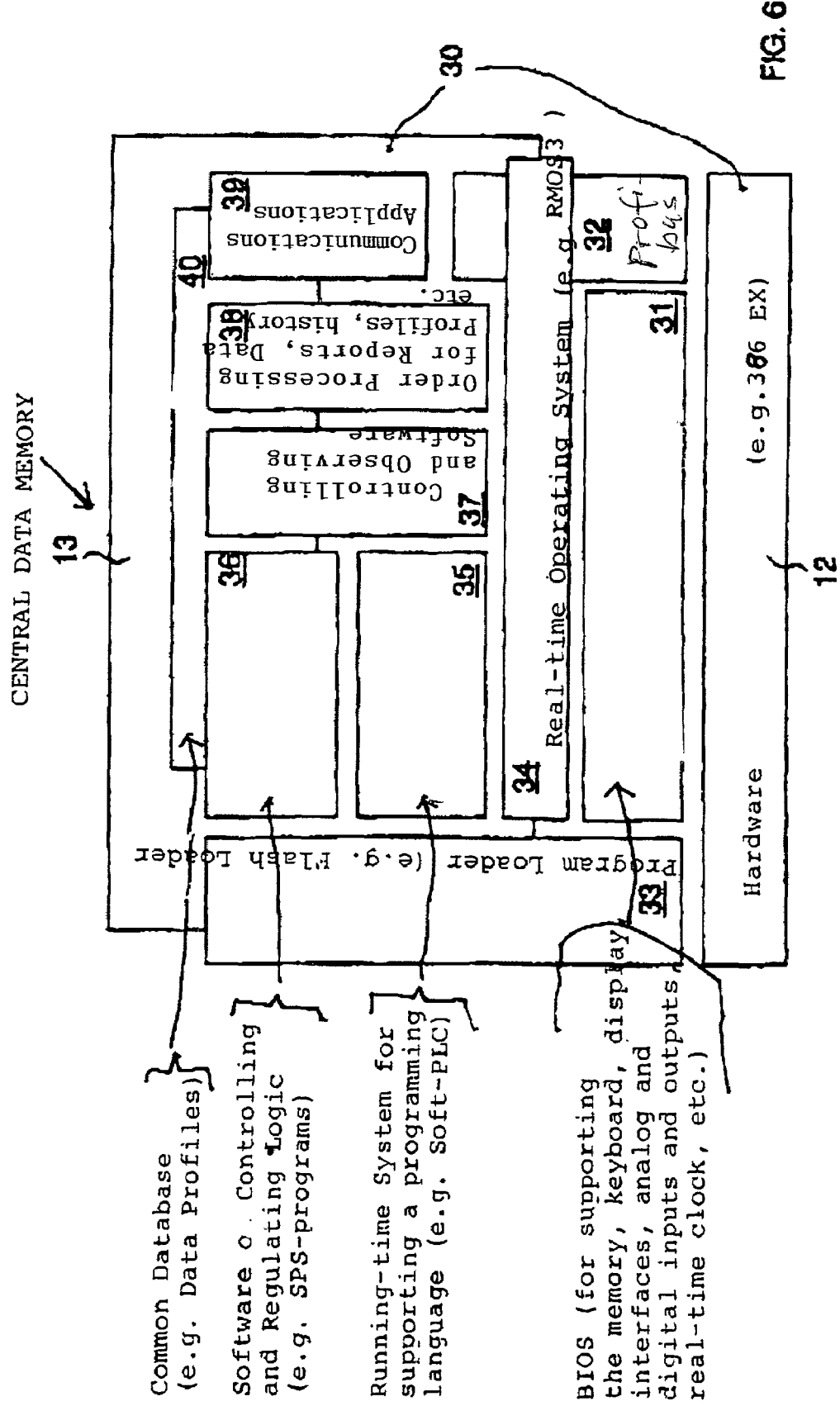
FIG. 6 shows a block diagram of the software employed for the control system as defined by the invention.

FIG. 6 shows by way of example the basic structure of a software for the control system as defined by the invention. A BIOS (basic input/output system) 31 is associated with the hardware 30 consisting of the processor 12 and the associated, comprehensive central data memory 13. Said BIOS supports in the conventional manner the memory, the keyboard, the display, the interfaces, the digital and analog inputs and outputs, as well as the real-time clock. Furthermore, the control system as defined by the invention has a software package 32 for the profi-bus interface, as well as a software package 33 for a program loader, for example a flash loader.

A real-time operating system 34 (e.g. RMOS 3) is installed via the BIOS 31. Said operating system provides for adequately rapid controlling and regulating interventions in the control system.

In the exemplified embodiment, the real-time operating system 34 supports a running-time system 35. Said running-time system is a software program or a virtual machine with the help of which program instructions of the controlling and regulating software are converted into a representation that can be processed by the microprocessor of the control system. In addition, the running-time system 35 assumes the control over the servicing of the programs. In the exemplified embodiment, said running-time system 35 is a soft-PLC or a soft-SPS and emulates a stored-program type control system.

Furthermore, the central data memory 13 contains the software 36 of the controlling and regulating logic, for example a number of SPS- or PLC-programs for the various functions of the aggregate to be controlled and regulated. Furthermore, provision is made for the software 37 for controlling and observing the control surface 7, and for the software 38 for various order processing routines, e.g. for processing reports, data profiles, the history memory etc. Finally, provision is made for software for processing the communication applications, specifically for the communication via the interfaces of the control system.

The central data memory 13 contains a great number of the special data profiles 40 that represent a part of the common database for the universal control system. Said aggregate-specific data profiles 40 comprise the data belonging to each aggregate with respect to the controlling and regulating control algorithms and/or the controlling and regulating parameters and/or the technical characteristics and limit values, and/or the aggregate-specific occupancy of the inputs and outputs, and can be called up in each case in a combined form from the data memory for an aggregate.

If need be, the control system as defined by the invention is capable of operating without the running-time system 35 as well. In such a case, the real-time operating system 34 directly supports the use of a programming language for the controlling and regulating software, for example the SPS- or the PLC-programs.

Figure 7:
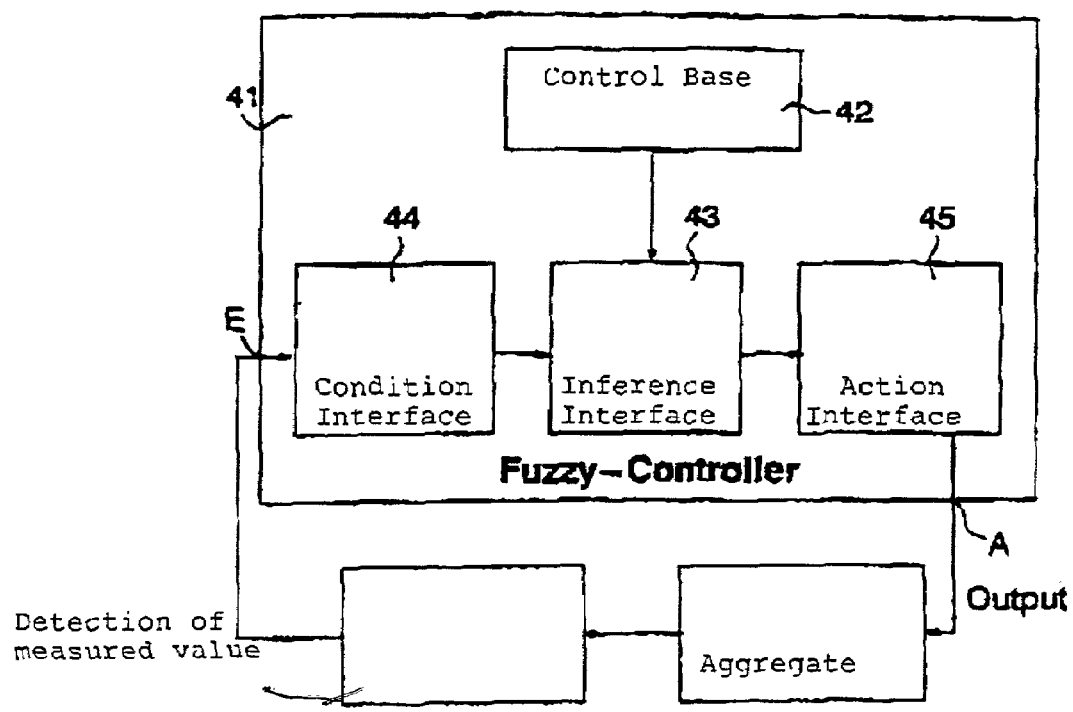
FIG. 7 shows a block diagram of a soft fuzzy controller installed in the control system as defined by the invention.

It is possible also, if need be, to install on the industrial PC or industrial microcomputer a software fuzzy controller 41 as it is shown in FIG. 7. Said software fuzzy controller comprises an installation-specific control base 42, an inference machine 43, a condition interface 44 associated with the inputs, as well as an action interface 45 associated with the outputs. It is possible with such a fuzzy controller 41 to use a very great number of measured values, and possibly also measured values that have been determined in a fuzzy way, for controlling and regulating the aggregate.

The invention claimed is:

1. An electronic control system for aggregates generating compressed air and vacuum, with programmable electronic circuits for controlling, regulating and monitoring the technical functions of such aggregates, in particular the functions of the compressed air generator or of the vacuum pump and of the associated drives, as well as of the treatment of the compressed air,
wherein the electronic control system is configured as a standardized control system for employment in a multitude of different aggregates for generating compressed air or vacuum, and has an industrial PC or industrial microcomputer monitored and controlled by an operating system and comprising one or a plurality of microprocessors and a central data memory containing at least controlling and regulating software and a multitude of aggregate-specific data profiles in a recallable manner, said data profiles comprising the data belonging to the aggregates and their components with respect to the controlling and regulating algorithms, and/or the controlling parameters, and/or the regulating parameters, and/or the technical characteristics and limit values, and/or the aggregate-specific occupancy of the inputs and outputs.

2. The control system according to claim 1,
wherein the operating system is a real-time operating system.

3. The control system according to claim 1,
wherein a running-time system (software processor or virtual machine) is installed on the operating system, said running-time system converting program instructions of the controlling and regulating software into a representation which can be processed by the one or several microprocessors of the control system, and which assumes the control over the processing.

4. The control system according to claim 3,
wherein the running-time system is a soft-PLC or soft-SPS and emulates a stored-program control.

5. The control system according to claim 1,
wherein the operating system without an additional running-time system supports the use of a programming language for the controlling and regulating software.

6. The control system according to claim 3,
wherein the controlling and regulating software is programmed in a programming language for stored-program control systems.

7. The control system according to claim 1,
wherein the data of each called-up data profile including the data determining the occupancy of the inputs and outputs are variable by means of the control surface and/or via a data interface.

8. The control system according to claim 7,
wherein several different, password-protected, hierarchically graded levels are set up for changing the data profiles or other adjustments.

9. The control system according to claim 1, wherein the software in the central data memory comprises:
(a) components for control and regulating logic;
(b) components for activation of an operating surface (operating and observation software);
(c) components for management of history memory (order processing);
(d) components for communication via interfaces (communication applications);
said components accessing a common data base in which said data profiles are also stored.

10. The control system according to claim 9,
wherein for the purposes of trouble analysis and analysis of the operating performance, the history memory retains a record of certain events or conditions that occurred in the past over a large span of time, such a record containing the date, the clock time, the status and explanations of such events or conditions.

11. The control system according to claim 10,
wherein the content of the history memory can be called up in plain text on the display and/or via the communicative data interfaces.

12. The control system according to claim 10,
wherein an evaluation algorithm for the history memory, with the help of which the performance of the control system can be optimized for the future by means of the stored events and/or conditions from the past.

13. The control system according to claim 1 comprising:
(a) a plurality of digital and analog inputs and outputs for detecting a condition and for controlling the connected aggregate components, whose occupancy can be fixed via the controlling and regulated software;
(b) a control surface with plain text display; and
(c) at least one standardized data interface for communicatively connecting primary, secondary or subordinated systems.

14. The control system according to claim 13,
wherein the industrial PC or industrial microcomputer and the associated data memory are arranged in a compact, screened housing that can be installed in the control panel of an aggregate for generating compressed air or vacuums, and whose front side has the control surface with plain text display, whereas the back wall or the top wall and/or the bottom wall and/or the side wall of the housing are provided with the digital and/or analog inputs and outputs and the data interfaces.

15. The control system according to claim 13,
wherein the software of the industrial PC or industrial microcomputer is freely programmable locally via one of the interfaces or via remote data transmission, and is thus adaptable in any desired way.

16. The control system according to claim 15,
wherein the software of the industrial PC or industrial microcomputer contains a stored-program timer function capable of controlling the aggregate according to a preset time program.

17. The control system according to claim 13,
wherein aggregate-specific software fuzzy controllers can be installed on the industrial PC or industrial microcomputer, said software fuzzy controllers each comprising an aggregate-specific control base of an inference machine and a condition interface associated with the inputs, as well as an action interface associated with the outputs.

18. The control system according to claim 13, further comprising
a serial RS-232 interface serving as one of the standardized communicative interfaces.

19. The control system according to claim 13, further comprising
a serial RS-485 interface serving as one of the standardized communicative interfaces.

20. The control system according to claim 13, further comprising
a profi-bus interface serving as one of the standardized communicative interfaces.

21. The control system according to 13,
wherein the system bus of the industrial PC or industrial microcomputer is provided with an interface for connecting extension pc motherboards preferably with additional inputs and outputs.

22. The control system according to claim 14,
wherein the inputs and outputs are designed in the form of plug terminals located on the back wall and/or the top wall and/or the bottom wall and/or the side walls of the housing.

23. The control system according to claim 14,
wherein the control surface has a protected foil keyboard and an LCD-display, whereby all functions of the control system can be called up in a menu-guided manner via the foil keyboard and are readable with their data on the LCD-display in different languages and/or unit systems in a manner that is reversible online.

24. The control system according to claim 14,
wherein the control surface has light-emitting diodes for monitoring and displaying the main functions and for failure and/or maintenance reports.

25. The control system according to claim 13,
further comprising additional free inputs and outputs.

26. The control system according to claim 25,
wherein the free outputs can be occupied via the control surface or the data interfaces with any signals present in the control system.

27. The control system according to claim 26,
wherein additional data profiles exist for occupying the free outputs, said additional data profiles being recallable and/or variable via the control surface or the data interfaces.

28. The control system according to claim 1,
wherein a test mode can be called up via the menu control, in conjunction with which test mode the values of the analog and/or digital inputs and outputs can be individually queried locally or via remote data transmission when the aggregate is in operation, and the conditions of the outputs, furthermore, can be preset in any desired way independently of the control logic when the aggregate is shut down.

* * * * *

UNITED STATES PATENT AND TRADEMARK OFFICE
CERTIFICATE OF CORRECTION

PATENT NO. : 7,263,413 B1
APPLICATION NO. : 09/719507
DATED : August 28, 2007
INVENTOR(S) : Hofmann It is certified that error appears in the above-identified patent and that said Letters Patent is hereby corrected as shown below:

On Title page, column 1, item (30), the Foreign Application Priority data should correctly read:

-- June 13, 1998 (DE) .................... 198 26 169.1--.

Signed and Sealed this

Twentieth Day of November, 2007

JON W. DUDAS
*Director of the United States Patent and Trademark Office*